US006894796B1

(12) United States Patent
Finlay et al.

(10) Patent No.: US 6,894,796 B1
(45) Date of Patent: May 17, 2005

(54) METHOD, SYSTEM, AND LOGIC FOR SELECTING LINE WORK AND CONTROL DATA FOR A PIXEL FROM MULTIPLE OBJECTS OF LINE WORK DATA PROVIDED FOR THE PIXEL

(75) Inventors: David Ernst Finlay, Boulder, CO (US); Phillip Keith Hoskins, Berthoud, CO (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/570,211

(22) Filed: May 12, 2000

(51) Int. Cl.[7] .......................... H04N 1/403; G06K 15/00
(52) U.S. Cl. ....................... 358/1.15; 358/2.1; 358/2.99; 358/3.01
(58) Field of Search ................. 358/1.1–1.9, 1.11–1.18, 358/2.1, 2.99, 3.21, 3.24, 501, 515; 715/530, 531; 382/173, 176; 712/28

(56) References Cited

U.S. PATENT DOCUMENTS

| 3,961,750 A | 6/1976 | Dao |
| 4,125,873 A | 11/1978 | Chesarek |
| 4,484,187 A | 11/1984 | Brown et al. |
| 4,570,233 A | 2/1986 | Yan et al. |
| 4,642,676 A | 2/1987 | Weinger |
| 4,675,666 A | 6/1987 | Peterson |
| 4,700,181 A | 10/1987 | Maine et al. |
| 4,918,626 A | 4/1990 | Watkins et al. |
| 4,924,414 A | 5/1990 | Ueda |
| 4,951,229 A | 8/1990 | DiNicola et al. |
| 5,058,040 A | 10/1991 | Tajima |
| 5,359,432 A | 10/1994 | Peltzer et al. |
| 5,454,071 A | 9/1995 | Siverbrook et al. |
| 5,477,543 A | 12/1995 | Purcell |
| 5,621,869 A | 4/1997 | Drews |
| 5,732,248 A | 3/1998 | Prouty et al. |
| 5,751,291 A | 5/1998 | Olsen et al. |
| 5,754,180 A | 5/1998 | Kivolowitz et al. |
| 5,760,780 A | 6/1998 | Larson et al. |
| 5,781,197 A | 7/1998 | Saunders |
| 5,835,095 A | 11/1998 | Smith et al. |
| 5,844,828 A | 12/1998 | Fujimura et al. |
| 5,852,711 A | 12/1998 | Campbell |
| 5,852,742 A | 12/1998 | Vondran, Jr. et al. |
| 5,857,035 A | 1/1999 | Rust |
| 5,948,050 A | 9/1999 | Diamondstein et al. |
| 5,949,909 A | 9/1999 | Kao et al. |
| 5,960,115 A | 9/1999 | Kao et al. |
| 6,006,244 A | 12/1999 | Mahurin |
| 6,049,390 A * | 4/2000 | Notredame et al. ........ 358/1.15 |

FOREIGN PATENT DOCUMENTS

| EP | 0886205 | 12/1998 |
| EP | 0886208 | 12/1998 |
| EP | 0886235 | 12/1998 |
| EP | 0886435 | 12/1998 |
| JP | 421077 | 4/1992 |

OTHER PUBLICATIONS

U.S. Appl. No. 09/569,777, filed May 12, 2000, entitled "Method, System, Program, and Data Structure for Generating Raster Objects".

* cited by examiner

*Primary Examiner*—King Y. Poon
(74) *Attorney, Agent, or Firm*—David W. Victor; Konrad, Raynes, & Victor LLP

(57) ABSTRACT

Disclosed is a method, system, and logic for processing pixel data. A first and second logic units each receive line work data and control data for pixels on a sheet from at least one object. The control data for one pixel indicates whether to use the line work data for the pixel or contone data for the pixel. Multiple objects may provide line work data and control data for a same pixel. The first and second logic units output control data indicating to use contone data or line work data for the pixel. A third logic unit receives the line work and control data outputted from the first and second logic units. The third logic unit then outputs control data indicating to use the contone data or line work data for the pixel.

27 Claims, 3 Drawing Sheets

METHOD, SYSTEM, AND LOGIC FOR SELECTING LINE WORK AND CONTROL DATA FOR A PIXEL FROM MULTIPLE OBJECTS OF LINE WORK DATA PROVIDED FOR THE PIXEL

CROSS-REFERENCE TO RELATED APPLICATIONS

This application is related to the following co-pending and commonly-assigned patent application, entitled "Method, System, Program, And Data Structure for Generating Raster Objects", to Jean M. Aschenbrenner, Christopher Kush, and John Varga, having application Ser. No. 09/569,777, which application is incorporated herein by reference in its entirety.

BACKGROUND OF THE INVENTION

1. Field of the Invention

The present invention relates to a method, system and logic for generating raster output from raster data for use by a raster output device, such as a printer, display device, etc.

2. Description of the Related Art

To print an image, a print engine processor, referred to herein as a raster image processor, converts the image in a page description language or vector graphics format to a bit mapped image indicating a value to print at each pixel of the image. The bit mapped image is sent to the printer to cause the print heads to print the specified color value at the pixel according to the information in the bit map. If a printer has multiple print heads, such as a print head for different colors, then bit maps are generated for each print head. The print heads overlay the images defined by their respective bit maps onto the print medium.

To produce the bit maps for the print heads, the raster image processor performs numerous transformations on a print image, which may include different types of data, such as line art, e.g., text and graphics, and continuous tone (contone), e.g., images. The raster image processor usually performs operations such as data compression, color space conversion, and halftoning when generating the raster bit map to print. After dissecting a print image into different components, such as color components, text art contone, images, etc., the raster image processor must then merge the different elements together so that the original image, previously split into different components, is reconstructed for the color plane process.

As newer printers print at ever higher resolutions and speeds, the amount of data needed to generate the print job correspondingly increases. One of the major limitations in increasing printer speed is the time required to rasterize print data, especially the time required by the raster image processor to break an image into different object components and then reassemble, screen and merge those components into a final bitmap image.

Thus, there is a need in the art to provide an improved method, system, and logic to transform print data, such as text, vector graphics, images and raster data into a final rasterized bit maps in a more timely manner to increase printer throughput.

SUMMARY OF THE PREFERRED EMBODIMENTS

To overcome the limitations in the prior art described above, preferred embodiments disclose a method, system, and logic for generating raster data. Raster objects capable of comprising line work or contone pixel data and control data for each pixel are retrieved. The control data for a pixel indicates whether to use pixel data from one line work or contone raster object for the pixel. Multiple line work and contone objects overlapping a same scan line are processed. The control data is used for a pixel to select the line work or contone pixel data for the pixel. The selected pixel data is then screened to generate output raster data, which is then transmitted to an imaging system to render on an output device.

In further embodiments, the retrieved pixel data and control data are buffered in a memory. The pixel data is accessed from the memory and decompressed before screening the selected pixel data if the data is decompressed. Further, the data from the memory may be buffered in at least one buffer accessible to screening logic performing the screening operation. The pixel data is accessed from the at least one buffer in order to screen the pixel data.

Preferred embodiments provide an algorithm and hardware structures for processing raster data such that an initial set of raster objects generated by a raster image are further processed by another logic component, such as a processor or hardware card. These set of raster objects generated by the raster image processor include color data from line work or contone objects and control bits indicating which raster object to use to select the color data for a pixel. In this way, many of the merging, screening and decompression operations are offloaded to an external hardware card or processor thereby relieving the raster image processor of substantial processing burdens. This relief provided to the raster image processor improves the performance of the raster generation process and ultimately improves print speed by allowing final output raster data to be fed at a faster rate to the printer.

BRIEF DESCRIPTION OF THE DRAWINGS

Referring now to the drawings in which like reference numbers represent corresponding parts throughout.

DETAILED DESCRIPTION OF THE PREFERRED EMBODIMENTS

In the following description, reference is made to the accompanying drawings which form a part hereof and which illustrate several embodiments of the present invention. It is understood that other embodiments may be utilized and structural and operational changes may be made without departing from the scope of the present invention.

Figure 1:
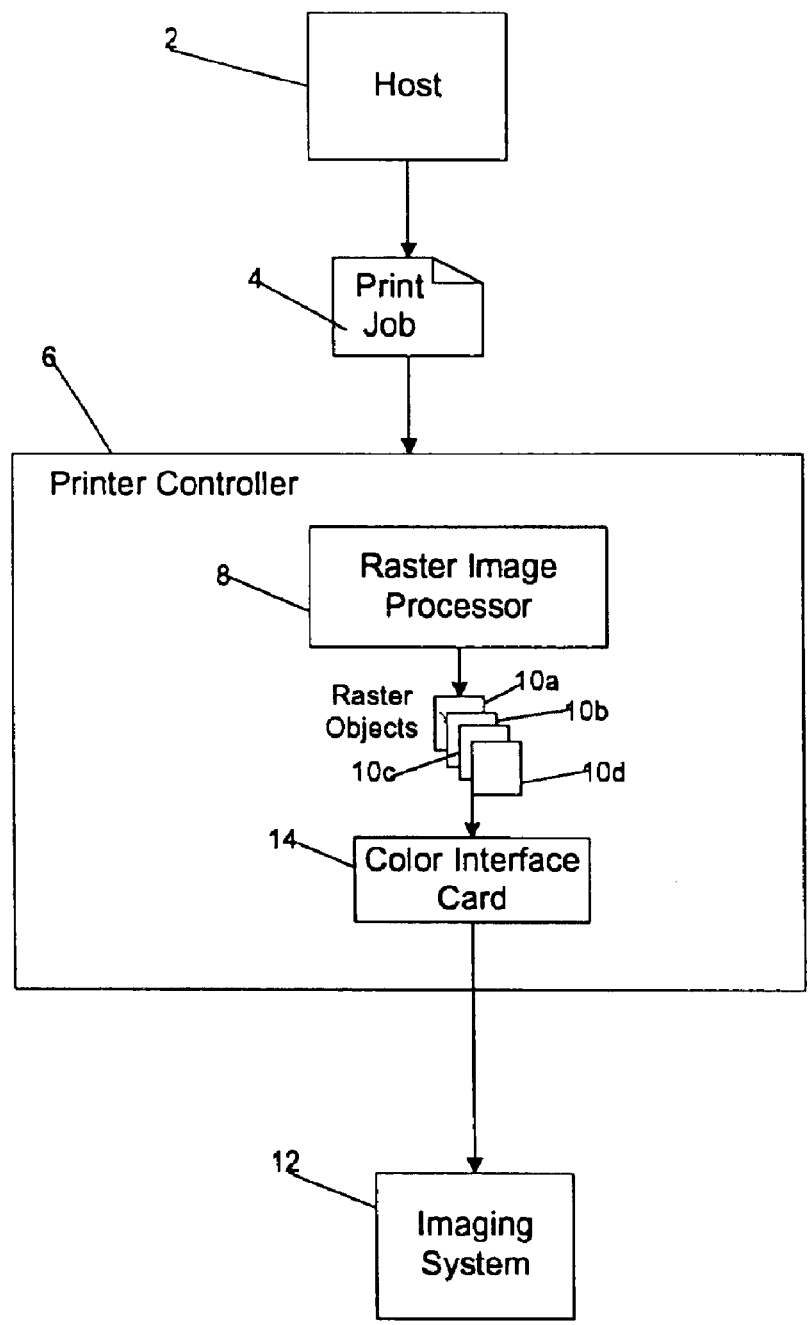
FIG. 1 illustrates a printing architecture in accordance with preferred embodiments of the present invention.

FIG. 1 illustrates a printing environment in which preferred embodiments are implemented. A host computer 2 generates a print job 4 that may include image (contone) and line work (text) components. The host 2 transmits the print job 4 to a printer controller 6 over a cable or network transmission line. The printer controller 6 may comprise a standalone processor or computer, such as the IBM RS/6000** processor. The printer controller 6 includes a raster image processor 8, that is preferably implemented in the RS/6000 main processor and accompanying firmware. In preferred embodiments, the raster image processor 8 generates raster objects 10a, b, c, d including the raster data.

Each raster object 10*a, b, c, d* includes pixel information for one color component of the imaging system 12. For instance, if the imaging system 12 prints Cyan (C), Magenta (M), Yellow (Y) and black (K), then there would be one raster object for each color component for a scan line to print. Further, there may be separate raster objects 10*a, b, c, d* for line art and contone (images), thus providing 8 separate raster objects for each color component of a scan line for the line art and contone components of the line. The printer controller 6 and imaging system 12 components may be implemented in the same large scale printer, such as the International Business Machines (IBM) Corporation's Infoprint color printers\*\*, or with a separate server and standalone printer communicating over a network or attached directly using a serial or parallel port.

\*\*RS/6000 and Infoprint are registered trademarks of International Business Machines Corporation.

Preferred embodiments include a color interface card (CIC) 14 that is preferably implemented on a hardware card, such as a PCI card using Field Programmable Gate Array (FPGA) logic. The CIC card 14 may be inserted in a PCI slot of the backplane of the printer controller 6. The CIC card 14 performs further processing of the raster objects 10 before they are sent to the imaging system 12 for printing.

In certain implementations, one CIC card 14 is capable of producing print data for two of the color planes. In such case, two CIC cards are needed to generate the final raster for the output device for all four color planes. In duplex implementations where the printer prints on both sides of a sheet concurrently, four CIC cards would be used, two for each side of the sheet to concurrently generate raster data for the print heads printing to both sides.

The Raster Objects Used by the CIC Card

The raster image processor 8 encodes the line work and contone objects with header information that enables the CIC card 14 logic to combine multiple line work and contone objects per scan line into final print output. In this way, many of the raster processing operations can be offloaded to a separate hardware card (e.g., the CIC card 14), thereby relieving the raster image processor 8 of many of the processor intensive raster operations. This in turn substantially increases the ultimate printer speed and performance because the final raster output data used by the printer (or other output device) is generated faster by offloading many of the raster processing operations to dedicated hardware logic implemented in the CIC card 14.

In described implementations, the raster image processor 8 is capable of generating four line work (LW) and four contone (CT) objects per scan line per color plane, i.e., a total of 32 objects. This limitation on the number of line work and contone objects per scan line is due to the capabilities of the CIC card. In described implementations, the CIC card 14 includes hardware logic to handle up to four line work and four contone objects per scan line per color, totaling 16 line work and 16 contone objects per scan line. For this reason, if the raster image processor 8 receives input print data objects including more than four contone or line work objects per scan line, then the raster image processor 8 must merge certain objects to conform to the CIC card 14 hardware limitations. If the CIC card 14 was capable of handling more or less line work or contone objects per scan line, ie., n objects, then the raster image processor 8 would have to merge input print data objects to ensure that there are no more than n line work or n contone objects per scan line.

The raster image processor 8 will generate contone objects that provide eight bits per pel for contone (CT) color data and line work objects that provide eight bits per pel for the line work (LW) color data. The raster image processor 8 further generates two line work control (LWC) bits for each pixel in the line work object. The line work control (LWC) bits can be encoded with one of three values, select line work (LW), select contone (CT) or transparent. Select line work (LW) instructs the CIC card 14 to use the pixel data in the line work object over data for the pixel in any other line work object or contone object. Select contone (CT) instructs the CIC card 14 to use the pixel data in the highest priority contone (CT) object over data for the pixel in any line work (LW) object, and transparent instructs the CIC card 14 to consider the line work control (LWC) bits in the next highest priority line work control object, i.e., the pixel is transparent and the next lower order line work data should be considered to determine whether it is non-transparent and used.

The raster image processor 8 will further generate header data for each line work and contone object for use by the CIC card 14. Following are the fields encoded in the line work and contone headers for each object Sequence Number: The raster objects for each color may then be numbered consecutively starting from zero for the raster (proxy) object at the top of the sheet. This new number is the sequence number. The sequence number is reset to zero for each color for the first object on the next sheet. Thus, raster objects are to be printed on a sheet according to the ordering of their sequence numbers. In preferred implementations, the maximum sequence number is fifteen. After reaching fifteen, the sequence number starts over at zero. The sequence number is used to determine whether raster objects are received in the correct order.

Object Type: Indicates whether an object is the first raster object on a sheet, a last object or a next object, which is any object between the first and last raster object. The object type would also indicate whether the object is the last raster object for the entire print job and whether a blank page is to be printed. In preferred embodiments, the object type is represented by a five bit code, where the first bit indicates that the raster object is the first object on the sheet; the second bit indicates that the raster object is a next object, i.e., following the first object on the sheet; the third bit indicates that the raster object is the last object on a sheet; the fourth bit indicates whether the raster object is the last raster object for the print job; and the fifth bit indicates to print the entire current sheet blank, such as if one of the colors will not appear on the sheet or there are no line work or contone objects for the sheet. To print a blank sheet, a null contone (CT) and line work (LW) object indicating to print a blank sheet would have to be generated for each color plane. The copending and commonly assigned patent application entitled "Method, System, and Program for Error Checking Raster Objects," having U.S. Ser. No. 09/499,722, filed on Feb. 8, 2000, which application is incorporated herein by reference in its entirety, describes how the object type information is used to check the order in which the objects are received.

Compression type: information on the compression algorithm used to compress the raster object.

Priority level: indicates the priority for objects overlapping the same scan line. Objects with a higher priority are printed preferentially in place of other objects on a per pel basis. Thus, objects for a pel of a higher priority will appear over objects for a pel of a lower priority unless the high priority object is transparent to allow the lower priority object for the pel to appear through the higher priority object. Thus, the priority level indicates the order in which objects overlapping on a scan line are overlaid. The priority numbers are chosen to correspond to priorities of the four objects that overlap the same set of one or more scan lines.

Start and Stop Transport Addresses: Indicates the first and last coordinates the raster object occupies on the sheet in the transport direction.

Start and Stop Scan Addresses: Indicates the first and last coordinates the raster object occupies on the sheet in the scan direction.

Start and Stop Clip in Transport Direction: Indicates the start and stop in the transport direction of where to clip image. For instance, if the start transport address is less than the start clip address, then the image will be clipped, not printed, for those pixels prior to the start clip address. If the end transport address is greater than the end clip transport address, then the image will also be clipped.

Start and Stop Clip in Scan Direction: Indicates the start and stop in the scan direction of where to clip image.

Link Address: A pointer to the line work or contone data represented by the header. The link address for line work header would specify both the address of the line work data (eight bits) and the line work control (LWC) bits.

After generating header objects for each contone and raster object, the raster image processor 8 generates one contone and one line work linked list of pointers to the headers according to the sequence number of the corresponding raster object. This list is then passed to the CIC card 14 to allow the CIC card 14 to gather information from the memory locations. The raster image processor 8 then hardens in memory the proxy objects as raster objects and the header objects thereof so that the raster object and header addresses will not be overwritten or altered in memory by the operating system before they are accessed and then released by the CIC card 14. In this way, all the raster object data is maintained in a high speed memory which provides fast access for the CIC card 14 when requesting the data to process. This memory arrangement further improves performance by allowing the CIC card 14 to immediately retrieve raster and header objects from a high speed, volatile memory.

The CIC Card Architecture

Figure 2:
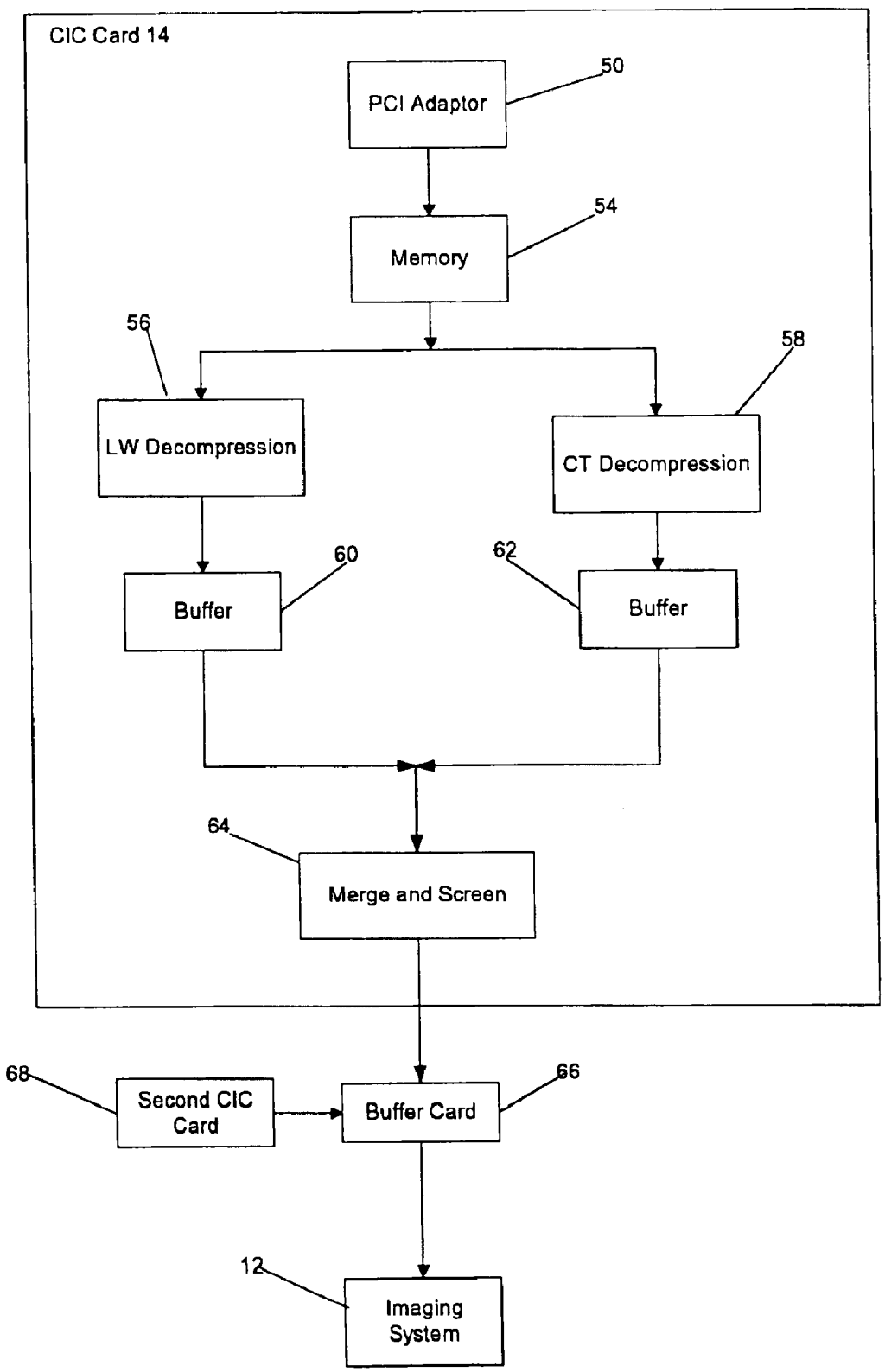
FIG. 2 illustrates hardware architecture implemented in a card that processes raster data in accordance with preferred embodiments of the present invention.

The CIC card 14 hardware retrieves the generated raster objects 10a, b, c, d, i.e., line work and contone objects, from the raster image processor 8 memory to generate final raster output for the imaging system 12. FIG. 2 illustrates a preferred embodiment architecture of the CIC card 14. A peripheral component interconnect (PCI) adaptor 50 includes logic to retrieve line work and contone objects from the raster image processor 8. Memory 54 buffers and stores the retrieved line work and contone objects and their headers. The memory 54 may comprise one or more memory cards for storing the header data, line work (LW) objects, contone (CT) objects, and line work control (LWC) objects. In preferred implementations, a separate memory card is used to store contone (CT) and line work (LW) data for each color plane (CMYK) and a separate card is used to store the header data. In embodiments where a CIC card 14 processes the line work (LW) and contone (CT) data for two color planes, there would be two memory cards, one for each color plane. The line work (LW) decompression 56 logic decompresses line work and line work control (LWC) objects and the contone (CT) 58 decompression logic decompress contone objects. The decompressor logic 56 and 58 writes the decompressed data into buffers 60 and 62, respectively.

The merge and screen logic 64 would access a byte of contone data from the contone (CT) buffer 62 and a byte of line work data from the line work buffer 60. Based on the value of the line work control (LWC) bits, i.e., line work select or contone select, the merge component of the logic 64 would merge the data into a single byte of data, from either the line work or contone data, and pass to the screening algorithm. Depending on the type of data, i.e., contone or line work, the screening logic would screen the data to provide the proper color intensity, and then write the data to the buffer card 66, which also receives pel data for two other color planes from a second CIC card 68. As discussed, in certain implementations, each CIC card 14 handles two color planes, thus requiring two cards for all four CMYK color planes.

Figure 3:
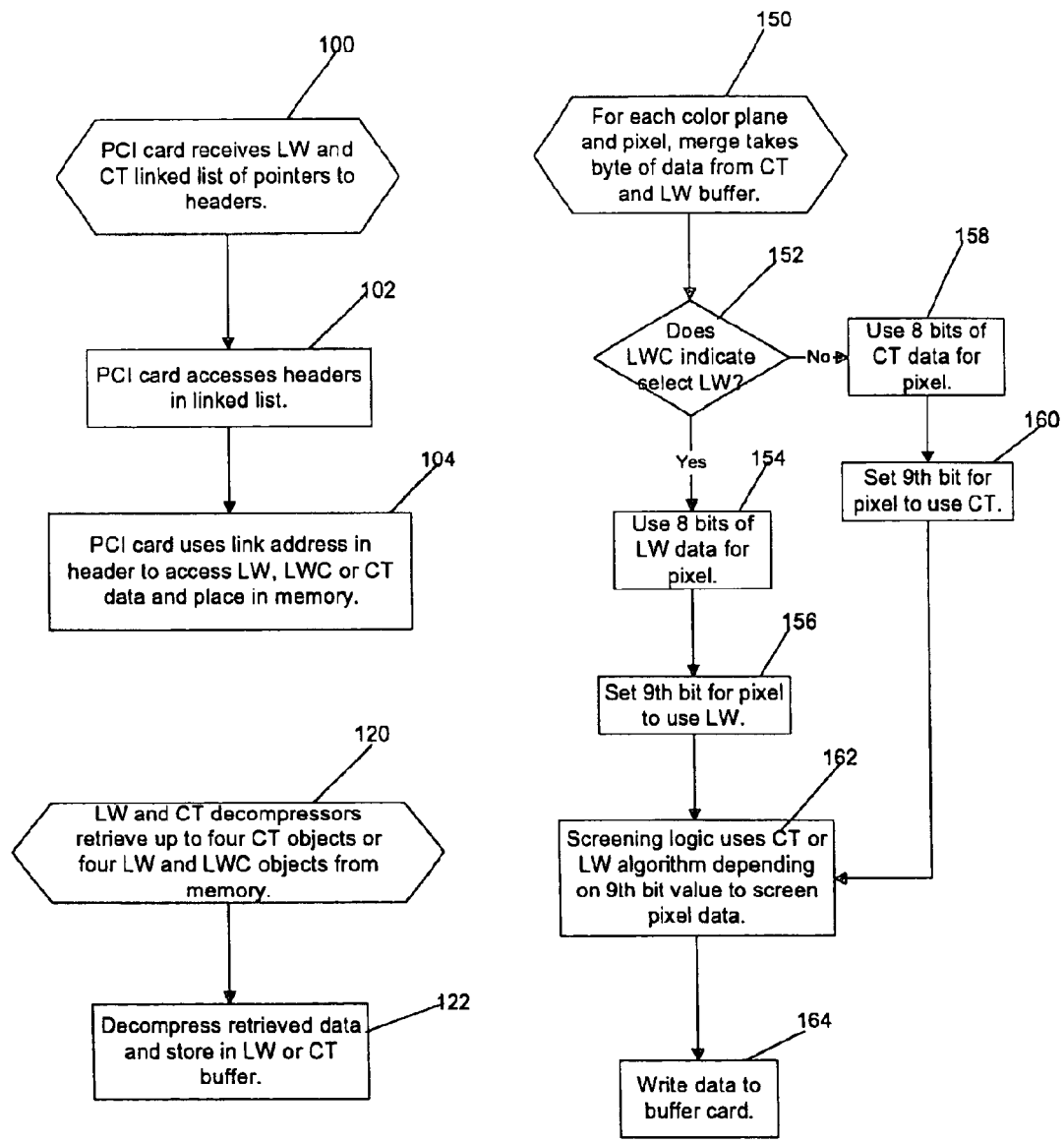
FIG. 3 illustrates logic implemented in the hardware card illustrated in FIG. 2 to process raster data.

FIG. 3 illustrates logic implemented in the above described hardware components of the CIC card 14 to process line work (LW), contone (CT) and line work control (LWC) objects from the raster image processor 8. At block 100, the PCI adaptor 50 receives one line work (LW) and one contone (CT) linked list of pointers to headers maintained in memory used by the raster image processor 8. The PCI adaptor 50 will then retrieve (at block 102) the line work (LW) and contone (CT) headers from the pointers in the linked list. As discussed a line work (LW) header includes a pointer to the line work control (LWC) bits for the pixel data. The PCI adaptor 50 then goes through the linked list of headers and uses (at block 104) the link address in each header to access the pixel data. For contone headers, the PCI adaptor 50 would access the contone object, e.g., eight bits of color data, using the link address in the header. For line work (LW) headers, the PCI adaptor 50 would access the line work (LW) object and line work control (LWC) data from the pointers provided in the line address of the header. The PCI adaptor 50 then loads the line work (LW) and contone (CT) pixel data as well as the line work control (LWC) data into memory 54.

At block 120, the line work 56 and contone 58 decompressors retrieve up to four line work and four contone (CT) objects, respectively from the memory. The decompressors 56 and 58 then decompress (at block 122) the data and store the data in the line work (LW) 60 and contone (CT) 62 buffers, respectively. However, if the data is not compressed, then the data will not be subject to any decompression operations.

At block 150 the merge logic component of the merge and screen logic 64 accesses a byte of data for one pixel form the contone (CT) and line work (LW) buffers 60, 62 for each color plane. If (at block 152) the line work control (LWC) specifies select line work (LW), then the merge logic uses (at block 154) the eight bits of line work data for the current pixel and sets a ninth bit (at block 156) to indicate that the byte is line work. Otherwise, the merge logic uses (at block 158) eight bits of contone (CT) data for the pixel and sets (at block 160) the ninth bit to indicate contone for the pixel. The screening logic component of the merge and screen logic 64 then selects (at block 162) a line work or contone screening algorithm, depending on the value of the ninth bit. The eight bits of selected data for the pixel are then screened to produce the proper color intensity. After screening, the merge and screw logic 64 then writes (at block 164) the final pixel data for two of the color planes, e.g., CM, to the buffer card 66, which also receives screened pixel data for the other two color planes, e.g., YK. The imaging system 12 then accesses the data as needed from the buffer 66 to render as output, e.g., on a display screen, printer, etc.

In preferred embodiments, the raster image processor 8 converts input print data into one or more line work or contone raster objects which may then be provided to the CIC card 14 to further process to generate the final print output. In this way, a substantial amount of raster processing operations that the prior art would implement in the raster image processor are handled, in the preferred embodiments, by hardware logic (the CIC card 14).

Preferred embodiments substantially improve print performance because in the preferred embodiments, the raster image processor 8 only performs those raster operations needed to generate separate line work and contone objects that are further processed, i.e., decompressed, merged and screened, by hardware logic, thus offloading many of the highly processor intensive operations to dedicated hardware logic which can often perform such operations faster than the programmable logic of the raster image processor 8.

Further by having two or more processors perform raster operations performed in the prior art by a single raster image processor, performance is substantially improved. Thus, preferred embodiments provide an improved way for allocating particular raster operations to the raster image processor 8 and to another processing unit, such as the CIC card 14, in order to improve the speed and performance of raster image processing.

Still further, by using multiple memory buffers during the raster processing operation, the CIC 14 card optimizes performance because data is always available for the logic. For instance, the PCI adaptor 50 retrieves data in the memory 54 at a rate such that there is always data pending while the decompressors 54 and 56 are decompressing data. Thus, the memory 54 makes data available to the decompressors 54 and 56 when the decompressor completes a decompression operation. Further, the buffers 60 and 62 are used to buffer decompressed data to always make available for the merge and screen logic 64 to use. This architecture has been found to be particularly useful because the decompressors 54 and 56 tend to decompress in burst mode, while the merge and screen logic 64 processes data at a relatively constant rate as needed by the imaging system 12. Thus, the buffers 60 and 62 ensure that data is always available for the merge and screen logic 64. The end result is that delays are minimized for the major processing operations within the dedicated logic of the CIC card 14, such as the decompression and merge and screen operations as data is always available to this logic for processing.

ALTERNATIVE EMBODIMENTS AND CONCLUSIONS

The following describes some alternative embodiments for accomplishing the present invention.

The preferred embodiments may be implemented in hardware or software logic using standard programming and/or engineering techniques to produce software, firmware, hardware, or any combination thereof. The logic defining the functions of the preferred embodiment can be delivered to a processor or programmable hardware logic via a variety of information bearing media, which include, but are not limited to, computer-readable devices, carriers, or media, such as a magnetic storage media, "floppy disk," CD-ROM, a file server providing access to the programs via a network transmission line, wireless transmission media, signals propagating through space, radio waves, infrared signals, etc. Of course, those skilled in the art will recognize that many modifications may be made to this configuration without departing from the scope of the present invention. Such information bearing media, when carrying computer-readable instructions that direct the functions of the present invention, represent alternative embodiments of the present invention.

In preferred embodiments, the raster objects had specific information, such as the object type, sequence number, etc., used to determine whether objects were received in the correct order. In alternative embodiments, further or modified information may be included in the raster objects to ensure that raster objects are processed in the correct order. Further there may be different or additional object types other than those discussed herein.

In preferred embodiments, the CIC card that processes the generated raster objects comprises hardware logic. In alternative embodiments, an additional processor may be used to perform the further processing of the raster objects generated in accordance with the preferred embodiments. Alternatively, a single processor may spawn multiple tasks to perform the operations performed by the different instances of the hardware logic. Still further, the logic of the CIC card may be divided across multiple computer cards or related devices.

In preferred embodiments, the raster objects are generated for a printer to use to control printer operations. However, in alternative embodiments the raster objects may provide color data for another device, such as a computer graphics card or display engine, to use when generating output display data.

Further, the CIC card 14 may be implemented in hardware other than a PCI card on the printer controller backplane. Still further, operations described as performed in the raster image processor may be moved to the CIC card or alternative raster logic.

In preferred embodiments, there were four sets of each of the hardware components to process up to four objects for a same scan line simultaneously. In alternative embodiments, there may be more or less instances of the hardware logic to processor more or less line work objects for a same line.

In summary, preferred embodiments disclose a method, system, and logic for generating raster data. Raster objects capable of comprising line work or contone pixel data and control data for each pixel are retrieved. The control data for a pixel indicates whether to use pixel data from one line work or contone raster object for the pixel. Multiple line work and contone objects overlapping a same scan line are processed. The control data is used for a pixel to select the line work or contone pixel data for the pixel. The selected pixel data is then screened to generate output raster data, which is then transmitted to an imaging system to render on an output device.

The foregoing description of the preferred embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A method for generating raster data, comprising:
   retrieving raster objects capable of comprising line work or contone pixel data and control data for each pixel, wherein control data for a pixel is encoded to indicate one of a selection of pixel data from one line work object, a selection of pixel data from a contone raster object, and a selection of transparency;
   processing multiple line work and contone objects overlapping a same scan line;
   using the control data for a pixel to select the line work or contone pixel data for the pixel;
   screening the selected pixel data to generate output raster data; and
   transmitting the output raster data to an imaging system to render on an output device.

2. The method of claim 1, further comprising:
   retrieving a list of pointers to header addresses;
   accessing the headers in the list, wherein each header includes a pointer to one line work or contone data object including pixel data; and
   using the pointer in each header to retrieve the line work or contone raster objects.

3. The method of claim 1, further comprising:
   buffering the retrieved pixel data and control data in a memory;
   accessing from the memory pixel data and control data; and
   decompressing the accessed data if the data is decompressed before screening the selected pixel data.

4. The method of claim 3, further comprising:
   buffering the data accessed from the memory in at least one buffer accessible to screening logic performing the screening operation; and
   accessing the pixel data from the at least one buffer in order to screen the pixel data.

5. The method of claim 4, wherein a line work buffer buffers line work pixel data and control data accessed from the memory and wherein a contone buffer buffers contone pixel data.

6. The method of claim 1, further comprising:
   setting one bit of the selected line work or contone pixel data to indicate whether the pixel data comprises line work or contone data; and
   selecting a line work screening algorithm if the one bit indicates that the pixel data comprises line work or selecting a contone screening algorithm if the one bit indicates that the pixel data comprises contone, wherein the selected screening algorithm is used to screen the pixel data to generate the output raster data.

7. The method of claim 1, wherein the selection of transparency indicates that a pixel corresponding a first line work object is transparent and that a second line work object should be considered, wherein the first line work object has a higher priority than the second line work object.

8. The method of claim 7, wherein the control data is encoded in at least two bits, and wherein the second line work object is a next lower order line work object to the first line work object.

9. The method of claim 8, further comprising:
   buffering the received pixel data and control data in a memory;
   accessing from the memory pixel data and control data;
   decompressing the accessed data if the data is decompressed before screening the selected pixel data;
   buffering the decompressed pixel data into at least one buffer accessible to scanning logic performing the screening operation thereon; and
   accessing the pixel data from the at least one buffer in order to screen the pixel data, wherein the pixel data and control data are available in the memory to the decompressor after completion of decompression operations and wherein the pixel data and control data are available in the at least one buffer for screening operations after completion of screening operations.

10. A system for generating raster data, comprising:
    means for retrieving raster objects capable of comprising line work or contone pixel data and control data for each pixel, wherein control data for a pixel is encoded to indicate one of a selection of pixel data from one line work object, a selection of pixel data from one contone raster object, and a selection of transparency;
    means for processing multiple line work and contone objects overlapping a same scan line;
    means for using the control data for a pixel to select the line work or contone pixel data for the pixel;
    means for screening the selected pixel data to generate output raster data; and
    means for transmitting the output raster data to an imaging system to render on an output device.

11. The system of claim 10, further comprising:
    means for retrieving a list of pointers to header addresses;
    means for accessing the headers in the list, wherein each header includes a pointer to one line work or contone data object including pixel data; and
    means for using the pointer in each header to retrieve the line work or contone raster objects.

12. The system of claim 10, further comprising:
    means for buffering the retrieved pixel data and control data in a memory;
    means for accessing from the memory pixel data and control data; and
    means for decompressing the accessed data if the data is decompressed before screening the selected pixel data.

13. The system of claim 12, further comprising:
    means for buffering the data accessed from the memory in a least one buffer accessible to screening logic performing the screening operation; and
    means for accessing the pixel data from the at least one buffer in order to screen the pixel data.

14. The system of claim 13, wherein a line work buffer buffers line work pixel data and control data accessed from the memory and wherein a contone buffer buffers contone pixel data.

15. The system of claim 10, further comprising:
    means for setting one bit of the selected line work or contone pixel data to indicate whether the pixel data comprises line work or contone data; and
    means for selecting a line work screening algorithm if the one bit indicates that the pixel data comprises line work or selecting a contone screening algorithm if the one bit indicates that the pixel data comprises contone, wherein the selected screening algorithm is used to screen the pixel data to generate the output raster data.

16. The system of claim 10, wherein the selection of transparency indicates that a pixel corresponding a first line work object is transparent and that a second line work object should be considered, wherein the first line work object has a higher priority than the second line work object.

17. The system of claim 16, wherein the control data is encoded in at least two bits, and wherein the second line work object is a next lower order line work object to the first line work object.

18. The system of claim 17, further comprising:
means for buffering the received pixel data and control data in a memory;
means for accessing from the memory pixel data and control data;
means for decompressing the accessed data if the data is decompressed before screening the selected pixel data;
means for buffering the decompressed pixel data into at let one buffer accessible to screening logic performing the screening operation thereon; and
means for accessing the pixel data form the at least one buffer in order to screen the pixel data, wherein the pixel data and control data are available in the memory to the decompressor means for after completion of decompression operations and wherein the pixel data and control data are available in the at least one buffer for sowing operations after completion of screening operations.

19. A hardware card for generating raster data, comprising:
logic for retrieving raster objects capable of comprising line work or contone pixel data and control data for each pixel, wherein control data for a pixel is encoded to indicate one of a selection of pixel data from one line work object, a selection of pixel data from one contone raster object, and a selection of transparency;
logic for processing multiple line work and contone objects overlapping a same scan line;
logic for using the control data for a pixel to select the line work or contone pixel data for the pixel;
logic for screening the selected pixel data to generate output raster data; and
logic for transmitting the output raster data to an imaging system to render on an output device.

20. The hardware card of claim 19, further comprising:
logic for retrieving a list of pointers to header addresses;
logic for accessing the headers in the list, wherein each header includes a pointer to one line work or contone data object including pixel data; and
logic for using the pointer in each header to retrieve the line work or contone raster objects.

21. The hardware card of claim 19, further comprising:
logic for buffering the retrieved pixel data and control data in a memory;
logic for accessing from the memory pixel data and control data; and
logic for decompressing the accessed data if the data is decompressed before screening the selected pixel data.

22. The hardware card of claim 21, further comprising:
logic for buffering the data accessed from the memory in at least one buffer accessible to screening logic performing the screening operation; and
logic for accessing the pixel data form the at least one buffer in order to screen the pixel data.

23. The hardware card of claim 22, wherein a line work buffer buffers line work pixel data and control data accessed from the memory and wherein a contone buffer buffers contone pixel data.

24. The hardware card of claim 19, further comprising:
logic for setting one bit of the selected line work or contone pixel data to indicate whether the pixel data comprises line work or contone data; and
logic for selecting a line work screening algorithm if the one bit indicates that the pixel data comprises line work or selecting a contone screening algorithm if the one bit indicates that the pixel data comprises contone, wherein the selected screening algorithm is used to screen the pixel data to generate the output raster data.

25. The hardware card of claim 19, wherein the selection of transparency indicates that a pixel corresponding a first line work object is transparent and that a second line work object should be considered, wherein the first line work object has a higher priority than the second line work object.

26. The hardware card of claim 25, wherein the control data is encoded in at least two bits, and wherein the second line work object is a next lower order line work object to the first line work object.

27. The hardware card of claim 26, further comprising:
logic for buffering the received pixel data and control data in a memory;
logic for accessing from the memory pixel data and control data;
logic for decompressing the accessed data if the data is decompressed before screening the selected pixel data;
logic for buffering the decompressed pixel data into at least one buffer accessible to screening logic performing the screening operation thereon; and
logic for accessing the pixel data from the at least one buffer in order to screen the pixel data, wherein the pixel data and control data are available in the memory to the decompressor after completion of decompression operations and wherein the pixel data and control data are available in the at least one buffer for screening operations after completion of screening operations.

* * * * *